Feb. 13, 1940.　　　G. POTAPENKO ET AL　　　2,190,323

METHOD OF AND APPARATUS FOR GEOPHYSICAL PROSPECTING

Filed Jan. 4, 1938　　　2 Sheets-Sheet 1

INVENTORS:
Gennady Potapenko,
Donald Folland,
BY Russell M. Otis
ATTORNEY.

Feb. 13, 1940.    G. POTAPENKO ET AL    2,190,323
METHOD OF AND APPARATUS FOR GEOPHYSICAL PROSPECTING
Filed Jan. 4, 1938    2 Sheets-Sheet 2

Fig. 4.

INVENTOR.
Gennady Potapenko,
Donald Folland,
BY
Russell M. Otis
ATTORNEY.

Patented Feb. 13, 1940

2,190,323

UNITED STATES PATENT OFFICE 2,190,323

METHOD OF AND APPARATUS FOR GEOPHYSICAL PROSPECTING

Gennady Potapenko and Donald Folland, Pasadena, Calif., assignors to Geo-Frequenta Corporation, a corporation of Delaware Application January 4, 1938, Serial No. 183,264

9 Claims. (Cl. 175—182)

Our invention relates to geophysical prospecting by determining the electrolytic polarization characteristics of the underlying earth, and to electrical switching apparatus employed in making such determinations.

An object of our invention is to provide a method of measuring the electrolytic polarization characteristics of the earth.

Another object is to provide apparatus for continuously measuring earth polarization.

Another object is to provide automatic switching apparatus for repeating a sequence of circuit connections with predetermined intervening time intervals.

These and other apparent objects we attain in a manner which will be clear from a consideration of the following description taken in connection with the accompanying drawings, of which, Fig. 1 is an illustration of an apparatus employed to demonstrate the phenomenon of electrolytic polarization.

Fig. 4 is a diagrammatic illustration of an apparatus employed in the practice of our invention.

Figure 1:
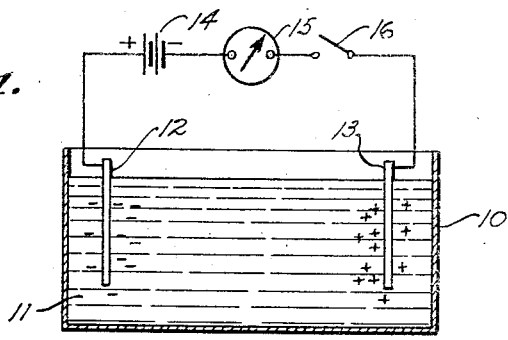
Figure 3:
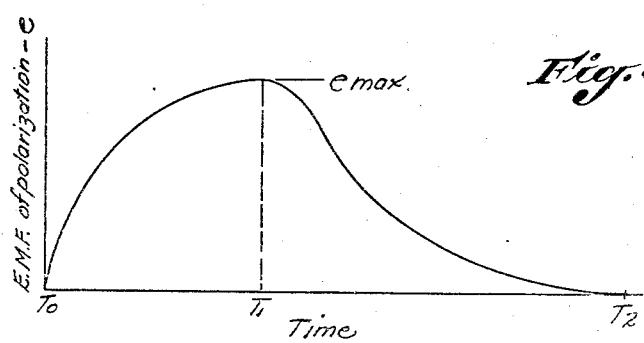
Fig. 3 shows the manner in which the electromotive force of polarization varies with time in the circuit of Fig. 1.
Figure 2:
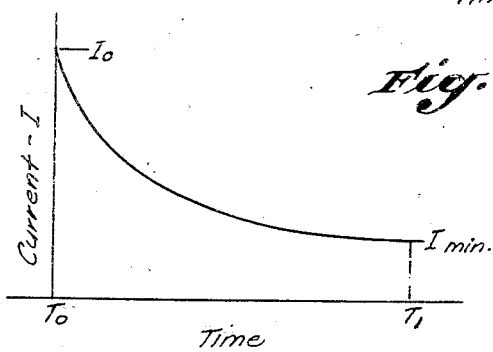
Fig. 2 shows the manner in which the current in the circuit of Fig. 1 varies with time.

The apparatus of Fig. 1 may be employed to demonstrate the phenomenon of electrolytic polarization, the efficient measurement of which is accomplished in the practice of our invention. A tank 10 contains an electrolyte 11 in which are partially immersed the electrodes 12 and 13 which are electrically connected in a circuit with the battery 14, direct current measuring instrument 15, and the switch 16, the positive terminal of the battery 14 being connected to the electrode 12. If the switch 16 is closed at time $T_0$, current starts flowing in a quantity determined by Ohm's law and represented by $I_0$ in Fig. 2. In ordinary electrolytes, however, the current I immediately starts to decrease as shown in Fig. 2 and eventually reaches a minimum value $I_{min}$ at time $T_1$. This decrease in current is due to polarization at inhomogeneities in the electrolyte, which in the apparatus of Fig. 1 exist at the surfaces of the electrodes. Negative charges concentrate near the surface of electrode 12 and positive charges concentrate near the surface of electrode 13, and these charges in effect result in a counter-electromotive force in the electrolytic circuit, which is the electromotive force of polarization. This E. M. F. of polarization, following the closing of switch 16 at time $T_0$ builds up as shown in Fig. 3 to a maximum value $e_{max}$ at time $T_1$ and, if the switch 16 is opened at time $T_1$, decreases, as shown, substantially to zero at time $T_2$. The E. M. F. of polarization during the discharge period $T_1$ $T_2$ is evidenced by a potential difference between the electrodes, which is proportional to the E. M. F. of polarization, and by continuously measuring this potential difference one may determine accurately the manner in which the E. M. F. of polarization discharges. When oil is employed as the liquid 11, similar phenomena occur except that the decrease in current is not observed to occur until after a delay of about 1 second, while for electrolytes only partially consisting of oil the polarization characteristics lie intermediate those for pure oil and those for electrolyte without oil.

Since the earth conducts electricity mainly as an electrolyte, polarization may be observed in the earth, as in the apparatus of Fig. 1. The earth is composed largely of strata and lenticular deposits of many different substances and provides many inhomogeneities at which polarization charges may concentrate, and since the various substances comprising the earth exhibit different polarization characteristics, the proper measurement of these characteristics may serve as a very efficient tool in geophysical prospecting to locate and identify the formations and structure of underlying earth.

In the practice of our invention we may employ the apparatus of Fig. 4. Electrodes 20 and 21 are electrically connected to the earth 22 and are adapted to be connected for a limited time period in a polarizing circuit with the source 23 of unidirectional current. Electrodes 24 and 25, preferably of the non-polarizing type, are also electrically connected to the earth and are adapted to be connected at suitable times to a measuring circuit comprising a direct current amplifier 26, the output of which is connected to a cathode ray oscillograph 27 in such manner that the oscillograph continuously measures and records the potential difference between the measuring electrodes 24 and 25 during the discharge of earth polarization following the polarizing period. Since the potential difference between the electrodes 24 and 25 during discharge of polarization is proportional to the E. M. F. of polarization then existing, this method provides an accurate way of determining the manner of variation of earth polarization.

Figure 5:
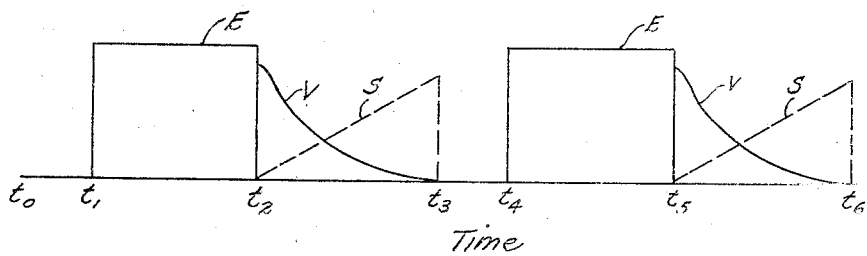
Fig. 5 shows the sequence of events occurring in the operation of the apparatus of Fig. 4.

The apparatus employed is preferably adapted to complete the polarizing circuit at time $t_1$ (Fig. 5) and to open the polarizing circuit at time $t_2$. In this polarizing period, an E. M. F. E is applied to the electrodes 20 and 21 and the E. M. F. of polarization of the earth is building up. At time $t_2$ the applied E. M. F. E drops to zero and the E. M. F. of polarization gradually decreases as shown in Fig. 3 in the period $T_1$ $T_2$. At time $t_2$ the electrodes 24 and 25 are connected to the amplifier 26 and the cathode ray oscillograph 27 is connected for operation. At time $t_3$ the measuring circuit between electrodes 24 and 25 is opened and the operation of the oscillograph 27 is interrupted. During the time interval $t_2$ $t_3$ the potential difference between electrodes 24 and 25 is continuously measured by the oscillograph and a record similar to curve V is made by the oscillograph. At time $t_4$ the polarizing circuit is preferably again connected and the entire sequence of events is again repeated. The apparatus is preferably adapted to repeat this sequence indefinitely, and by this means an average curve under equilibrium conditions is obtained which is better than that obtainable from a single cycle such as between $t_1$ and $t_4$.

The time period $t_1$ $t_2$ during which the polarizing E. M. F. is applied and the time period $t_2$ $t_3$ during which the polarization is discharging and is measured by the oscillograph are always greater than 1 second and are generally made of the order of 10 to 20 seconds duration. By this procedure we eliminate all effect of transient phenomena which take place in relatively short time intervals following application of an applied E. M. F., and which have nothing to do with the polarization phenomena with which we are concerned, but which are rather dependent upon the electrical constants of the connecting circuits as well as of the earth circuit.

In the apparatus of Fig. 4, we employ a four-pole, double-throw relay 30, a five-pole, double-throw relay 31, and a three-pole, double-throw relay 32 whose operation is controlled by the thyratron tubes 33, 34, and 35, respectively. The cathodes of all the thyratrons are connected together and to the positive terminal of the direct current source 36. Heaters for the cathodes of the thyratrons are suitably energized from an electrical source. The heaters are eliminated from the drawings in the interest of clearness. Connected in parallel across the source 36 are the potentiometers 37, 38, and 39, the movable arms of which are connected to the grids of the thyratrons 33, 34, and 35, respectively. A source 40 of direct current has its negative terminal connected to the cathodes of all the thyratrons and its positive terminal connected to the switch arm of switch 30a of relay 30. The upper contact of switch 30a is connected through the variable resistance 41 and the operating coil 42 of relay 30 to the anode of thyratron 33; and between the cathodes of the thyratrons and a point between resistance 41 and coil 42 is connected a condenser 43 of suitable capacity. In a similar manner the upper contacts of the switches 31a and 32a are connected respectively to the variable resistances 44 and 45, which connect through the operating coils 46 and 47, respectively, of the relays 31 and 32, respectively, to the anodes of thyratrons 34 and 35, respectively. The condensers 48 and 49 are connected in the circuits of thyratrons 34 and 35, respectively, in a manner similar to that in which condenser 43 is connected in the circuit of thyratron 33. The normal positions of the switch arms of the three relays is up, contacting the upper contacts, and the energization of the operating coils 42, 46, and 47 causes the relays which they control to operate and the switch arms thereof to be contacted to the lower contacts of the relays until reset to their normal positions as will hereinafter be explained.

The operation of each of the thyratron circuits in controlling its associated relay may be understood from consideration of the operation of the control circuit of thyratron 33. With the switch arms of relay 30 contacting the upper contacts, the condenser 43 will be subjected to a charging E. M. F. from source 40 acting through switch 30a and resistance 41. When the potential difference across condenser 43 becomes sufficiently great, the thyratron tube 33 breaks down and a current passes to the anode of the thyratron 33 through the operating coil 42, causing the relay 30 to operate and the switch arms to contact the lower contacts of the relay. The time between resetting of the relay 30 to contact its upper contacts and operation of the relay as described above is controlled by the product of the resistance 41 and the capacity of condenser 43, the time being greater for greater values of this product. By variation, then, of the resistance 41, the time elapsing before operation of relay 30 may be varied.

The lower contact of switch 30a is connected to the switch arm of switch 31a, and the lower contact of switch 31a is connected to the switch arm of switch 32a. It will be clear, then, that operation of relay 30 energizes the control circuit of thyratron 34 which after a time interval, determined by the product of resistance 44 and the capacity of condenser 48, operates in the manner ascribed to the circuit of thyratron 33 and causes operation of relay 31. This energizes the circuit of thyratron 35 which in turn causes operation of its associated relay 32 after a time interval determined by the resistance 45 and the capacity of condenser 49.

According to our invention, the operation of the relay 32 is adapted to cause resetting of all the relays and in this manner initiate a repetition of the entire sequence of switching events. This is accomplished by providing the relays 30, 31, and 32 with reset coils 50, 51, and 52, respectively, which when energized are adapted to reset their associated relays in normal position with their switch arms contacting their upper contacts. The reset coil 50 is connected between one terminal of an electrical source 53 and the lower contact of switch 30d. The reset coil 51 is connected between the same terminal of source 53 and the lower contact of switch 31e. The reset coil 52 is connected, through a resistor 54, between the same terminal of source 53 and the switch arm of switch 32c. The other terminal of source 53 is connected through switch 55 with the lower contact of switch 32c. The switch arms of switches 30d, 31e, and 32c are all connected together. When relay 32 operates so as to contact switch 32c to its lower contact, all of the reset coils 50, 51, and 52 are energized and the relays 30, 31, and 32 are reset to their normal positions with the switch arms up, whereupon the sequence of switching events is again repeated. The resistor 54 assures slower action of the reset coil 52 and causes the relay 32 to be the last to reset. Should it be desired to stop the operation of the switching apparatus at the end of any one cycle, it is only necessary to open switch 55.

The polarizing and measuring circuits and their connections to the relay switches will now be described. The electrode 20 of the polarizing circuit is connected to the lower contact of switch 30b. The switch arm of switch 30b is connected to the switch arm of switch 31b. The upper contact of switch 31b is connected to one terminal of the source 23, the other terminal of which is connected to electrode 21 of the polarizing circuit. It will be clear that operation of relay 30 closes the polarizing circuit, while operation of relay 31 opens the polarizing circuit. The electrode 24 of the measuring circuit is connected to one of the input terminals of the direct current amplifier 26, the other input terminal of which is connected to the electrode 25 of the measuring circuit through switch 31c when contacting its lower contact. Thus operation of relay 31 connects the measuring electrodes to the amplifier 26 so that the potential difference between the electrodes may be measured. The direct current amplifier 26 is adapted to amplify the relatively small potential difference between the electrodes 24 and 25 to a value suitable to influence in a satisfactorily measurable degree the oscillograph 27. Such amplifiers are well known in the radio art, a representative circuit being such as that shown in Electrical Engineers Handbook, 3rd edition, John Wiley & Sons, vol. 5, section 14, page 7.

While oscillographs of various other types may be used, we prefer to employ a cathode ray oscillograph to continuously measure the output from the amplifier 26 during the chosen measuring period. Such a cathode ray oscillograph comprises an evacuated envelope 60 having exposed to view a fluorescent screen 61 which is sensitive to the impact of electrons thereon. A filament 62 is heated by current from electrical source 63 and serves as a source of electrons. The electrons are accelerated by an electric field through a potential difference created by battery 64, and are directed in a well-defined beam of small cross-section toward the screen 61. In passing between the plates 65 and 66, which are disposed vertically one above the other, the moving electrons are diverted in a vertical direction, either up or down, depending upon the relative electric potentials of the plates 65 and 66. By impressing on the plates 65 and 66 the varying potential difference which it is desired to observe, the light spot on the screen 61 is caused to move up and down in conformity with the varying potential difference. The plates 65 and 66 are connected to the output terminals of the amplifier 26, and are therefore subjected to a potential difference proportional to that between electrodes 24 and 25. In order to cause the spot of light on screen 61 to trace a curve representing the variation of the measured potential difference with time, the electron beam is caused to pass between the plates 67 and 68 which are disposed horizontally with respect to one another, and a potential difference varying uniformly with time is applied to the plates 67 and 68. The vertical movement of the light spot is thus accompanied by a uniform horizontal movement. The uniformly varying potential difference is provided by a condenser in the process of being charged. To this end, the plate 68 is connected to one terminal of each of condensers 69 and 70, which are of different value; and plate 67 is connected to the switch arm of the double-throw switch 71, which in one position connects to the other terminal of condenser 69 and in the other position connects to the other terminal of condenser 70. The movable arm of switch 71 is also connected through variable resistance 72 to the switch arm of switch 31d. The plate 68 is connected to one terminal of the battery 73, the other terminal of which is connected to the upper contact of the switch 32b. The lower contact of switch 31d is connected to the switch arm of switch 32b, completing a charging circuit, spoken of as the sweep circuit comprising battery 73, resistance 72 and one of condensers 69 and 70 when the relay 31 is in its lower or operated position and relay 32 is in its normal or upper position. The plates 67 and 68 are shorted by the switch 30c when in its upper or normal position to reduce the sweeping potential difference to zero.

In operation, assuming all the relays have been reset to their upper position at time $t_0$, a time period $t_0$ $t_1$ elapses before operation of relay 30, which time period may be varied by changing the resistance 41. At time $t_1$ relay 30 operates and applies polarizing electromotive force E to the electrodes 20 and 21 for a time period $t_1$ $t_2$ which may be varied by changing resistance 44. At time $t_2$ the relay 31 operates, opening the polarizing circuit, connecting the measuring electrodes 24 and 25 to the amplifier 26, and energizing the sweep circuit. The oscillograph is connected for measuring the potential difference between electrodes 24 and 25 during the time period $t_2$ $t_3$, the duration of which may be varied by changing resistance 45. In this period the potential difference between the measuring electrodes may vary with time according to the curve V and be shown on the oscillograph as a curve with this form. Assuming condenser 69 to be connected in circuit by switch 71, charging of condenser 69 by battery 73 through resistance 72 is started at time $t_2$, the potential difference across the condenser building up as dotted line S. The rate of charge may be adjusted by varying resistance 72 or by shifting switch 71 to connect condenser 70 of different capacity. As the potential difference S across the condenser, and therefore across the plates 67 and 68, increases, the light spot on the oscillograph screen travels horizontally as is necessary to assure tracing of the curve V. At time $t_3$ the relay 32 operates disconnecting the sweep circuit and resetting all relays to their normal positions with the switch arms contacting the upper contacts. At the resetting of relay 30 the condenser 69, or condenser 70 if it is in circuit, is shorted by switch 30c, causing the potential difference S to fall to zero where it remains until charging again starts at time $t_5$. Operation of relay 30 then takes place at time $t_4$ and the entire sequence of operations is repeated indefinitely.

The curve V traced by the spot of light on the oscillograph screen may be photographed to provide a record of the variation with time of the potential difference between the measuring electrodes 24 and 25, or the movement of the spot of light may be visually observed and traced by means of pencil and paper. For visual observation particularly, we prefer to use an oscillograph tube having a screen containing phosphorescent or other suitable material causing light to continue to come from each position occupied by the light spot for a considerable time after the spot has moved on. By this means the entire curve V traced by the light spot remains constantly visible on the screen.

The time intervals composing the cycle of events described may be varied to measure the change in polarization under different conditions, but we preferably make the interval $t_2 t_3$ sufficiently long to permit the earth polarization to reduce substantially to zero. We may make the interval $t_1 t_2$ sufficiently long to assure a maximum polarization as in Fig. 3, or we may make this time interval of various values less than that required to reach the maximum and observe the discharge curve V under each condition. We may also conduct each or all of these measurements with various values of the applied potential difference E. In any case, the periods $t_1 t_2$ and $t_2 t_3$ are made longer than 1 second, as previously described.

In conducting field operations employing the method and apparatus herein disclosed, we preferably make any or all of the above-described measurements at each of a plurality of electrode spacings. The greater the electrode spacing, the greater is the depth of formation which can affect the measured polarization; so by varying the electrode spacing and noting at what separation of electrodes a certain polarization effect becomes noticeable, it is possible to estimate the approximate depth of the formation responsible for it. We may vary the spacing of both pairs of electrodes together, or we may move the electrodes 24 and 25 around to explore the surrounding region for each setting of the electrodes 20 and 21.

It is understood that variations and modifications in the method and apparatus disclosed herein may be made by those skilled in the art without departing from the spirit of the invention defined by the appended claims.

We claim as our invention:

1. A method of geophysical prospecting comprising polarizing the earth for a limited time period by application thereto of a unidirectional electromotive force, and continuously measuring the instantaneous value of the resultant earth polarization during discharge of said polarization following said polarizing period.

2. A method of geophysical prospecting comprising polarizing the earth for a limited time period by application thereto of a unidirectional electromotive force, and continuously measuring between spaced points in the earth the instantaneous value of the potential difference due to earth polarization during discharge of said polarization following said polarizing period.

3. A method of geophysical prospecting comprising subjecting the earth to intermittent polarizing applications of a unidirectional electromotive force, and continuously measuring the instantaneous value of the resultant earth polarization during portions of the discharge intervals between said polarizing applications.

4. A method of geophysical prospecting comprising subjecting the earth to intermittent polarizing applications of a unidirectional electromotive force, and continuously measuring between spaced points in the earth the instantaneous value of the potential difference due to earth polarization during discharge of said polarization in the intervals between said polarizing applications.

5. In combination, a pair of spaced electrodes electrically connected to the earth, a source of unidirectional electromotive force connected in a polarizing circuit with said electrodes, a second pair of spaced electrodes electrically connected to the earth, a cathode ray oscillograph connected in a measuring circuit and responsive to the potential difference between said second pair of electrodes, a sweep circuit for said oscillograph, and switching means adapted to intermittently close said polarizing circuit during polarizing periods, and close said measuring circuit and said sweep circuit during discharge of the resultant earth polarization in the intervals between said polarizing periods.

6. In combination, a pair of spaced electrodes electrically connected to the earth, a source of unidirectional electromotive force connected in a polarizing circuit with said electrodes, a second pair of spaced electrodes electrically connected to the earth, a cathode ray oscillograph connected in a measuring circuit and responsive to the potential difference between said second pair of electrodes, a sweep circuit for said oscillograph including a condenser to be charged, three relays each providing switches adapted to occupy normal and operated positions, three vacuum tubes each controlling the operation of one of said relays and causing operation of its associated relay at a time following its energization by a predetermined time interval, connections between said relays for permitting operation of each relay to energize the vacuum tube associated with the succeeding relay, and means for resetting the switches of all of said relays to normal position and controlled by operation of the last of said relays to operate, switches of one of said relays being connected upon operation to close said polarizing circuit and to short the condenser of said sweep circuit, switches of the succeeding relay being connected upon operation to open said polarizing circuit, close said measuring circuit, and energize said sweep circuit, and switches of the third of said relays being connected upon operation to de-energize said sweep circuit, whereby said polarizing circuit is intermittently closed during polarizing periods and said measuring and sweep circuits are closed during discharge of the resultant earth polarization in the intervals between said polarizing periods.

7. Switching apparatus comprising in combination, a plurality of relays each providing switches adapted to occupy normal and operated positions, a plurality of vacuum tubes each controlling the operation of one of said relays and causing operation of its associated relay at a time following its energization by a predetermined time interval, connections between said relays for permitting operation of each relay to energize the vacuum tube associated with the succeeding relay, and means for resetting the switches of all of said relays to normal position and controlled by operation of the last of said relays to operate.

8. Switching apparatus comprising in combination, a plurality of relays each providing switches adapted to occupy normal and operated positions, a plurality of vacuum tubes each controlling the operation of one of said relays and causing operation of its associated relay at a time following its energization by a predetermined time interval, connections between said relays for permitting operation of each relay to energize the vacuum tube associated with the succeeding relay, a reset coil associated with each of said relays and adapted when energized to reset the switches of its associated relay to normal position, and means adapted to energize all of said reset coils upon operation of the last of said relays to operate.

9. Switching apparatus comprising in combination, a plurality of relays each providing switches adapted to occupy normal and operated positions, a plurality of thyratron tubes each controlling the operation of one of said relays through a control circuit, each of said control circuits comprising an electrical resistance and the operating coil of the associated relay in series with the anode of the associated thyratron and a condenser connected between the cathode of said thyratron and a point between said resistance and said operating coil whereby said thyratron breaks down and allows current to pass through said operating coil to operate said relay at a predetermined time following energization of said control circuit, a source of direct current adapted to energize the control circuit of the thyratron associated with the first of said relays through a switch of said first relay when in its normal position, connections between said relays for permitting operation of each relay to energize the control circuit of the thyratron associated with the succeeding relay, a reset coil associated with each of said relays and adapted when energized to reset the switches of its associated relay to normal position, and means adapted to energize all of said reset coils upon operation of the last of said relays to operate.

GENNADY POTAPENKO.
DONALD FOLLAND.